July 30, 1957     H. J. LUTHMAN     2,800,684
APPARATUS FOR FORMING POWDERED METAL PARTS
Filed July 28, 1953     4 Sheets-Sheet 1
FIG. I
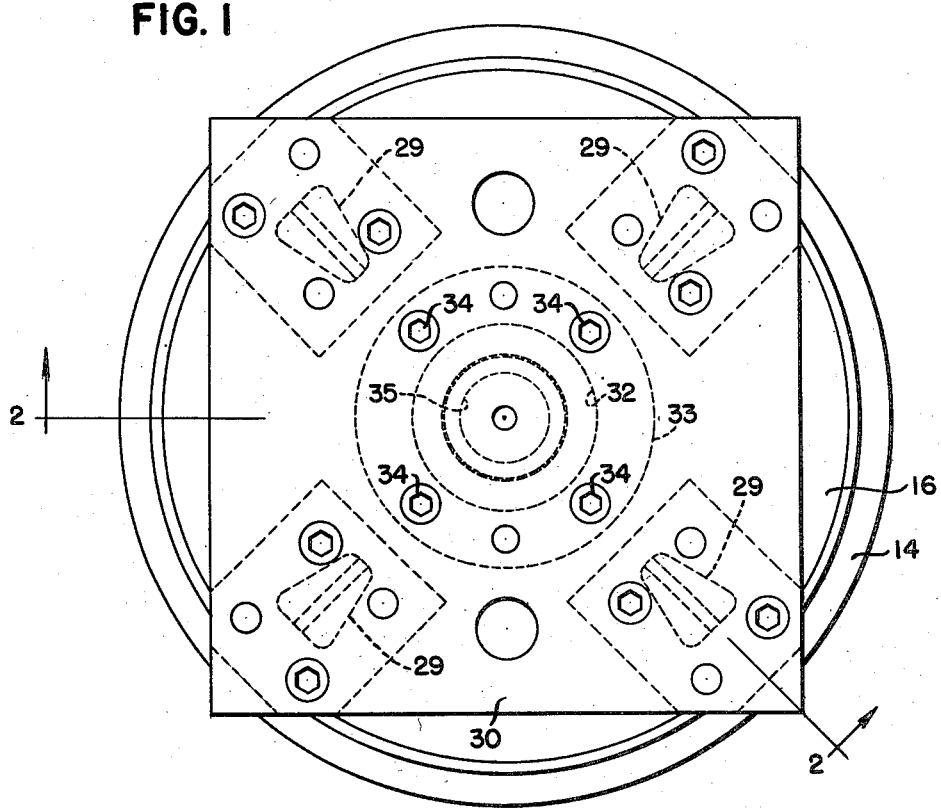
INVENTOR
HERBERT J. LUTHMAN, DEC'D
BY HENRIETTA A. LUTHMAN
EXECUTRIX
BY *Karl Beust*
*Henry Silbereis*
HER ATTORNEYS

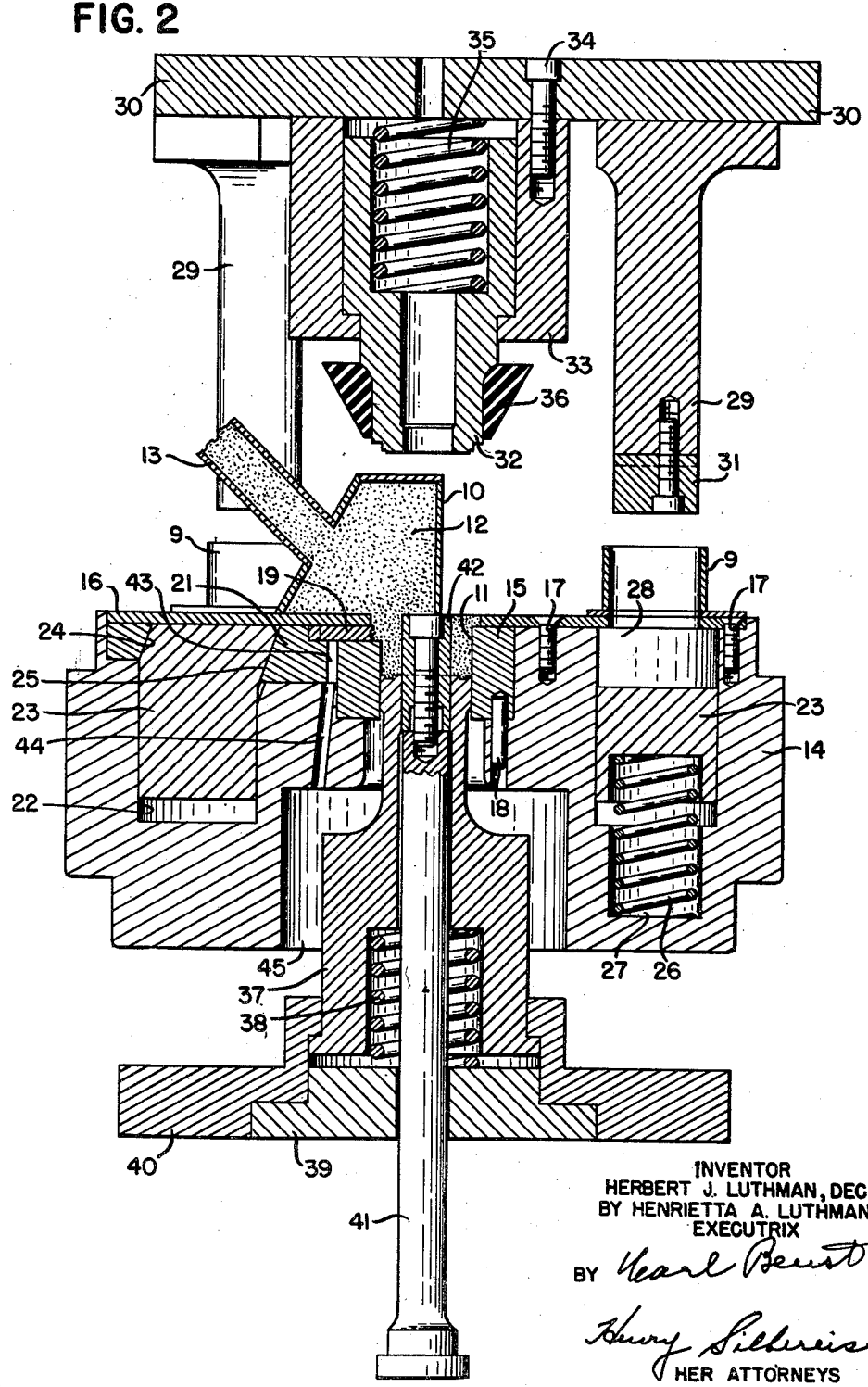

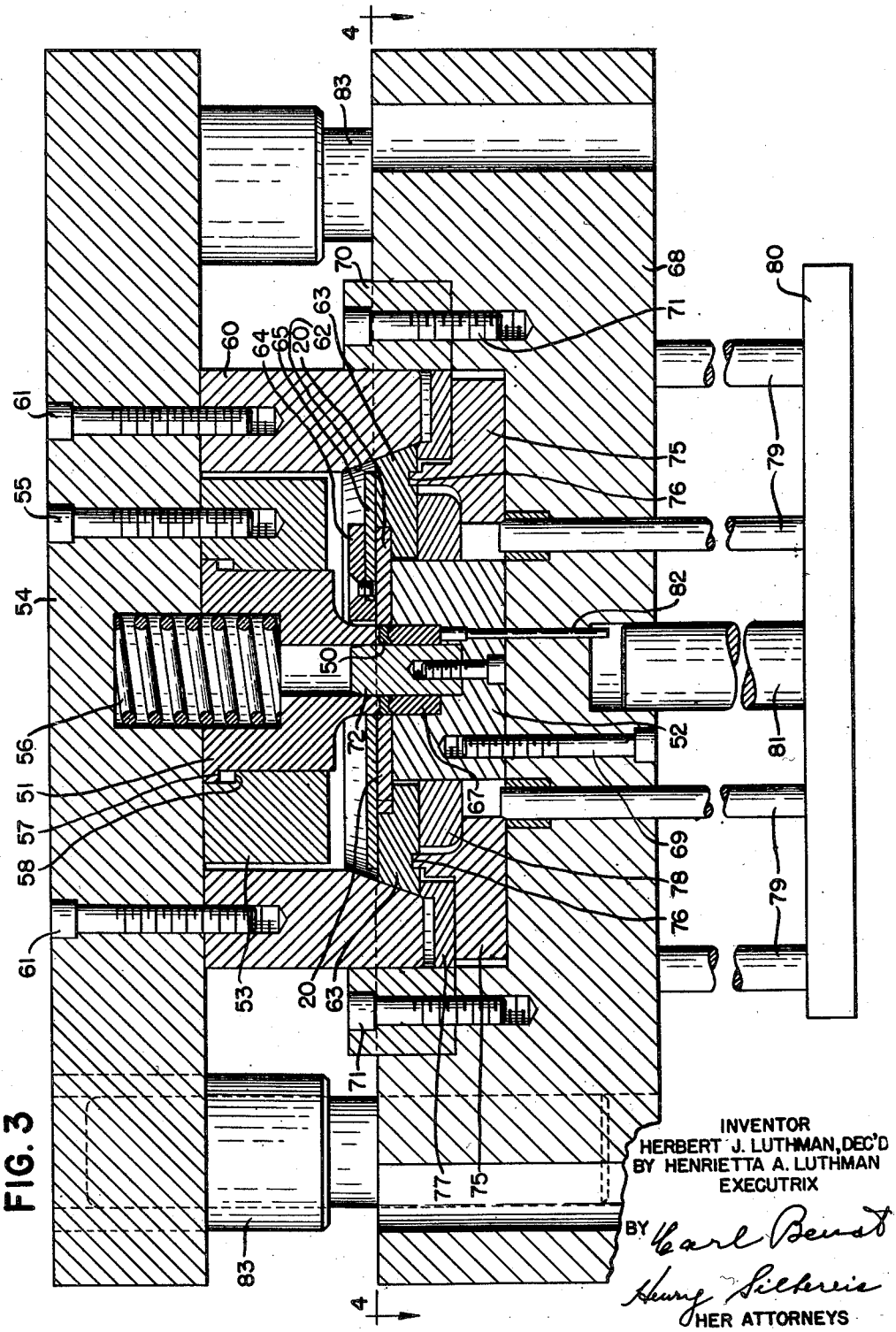

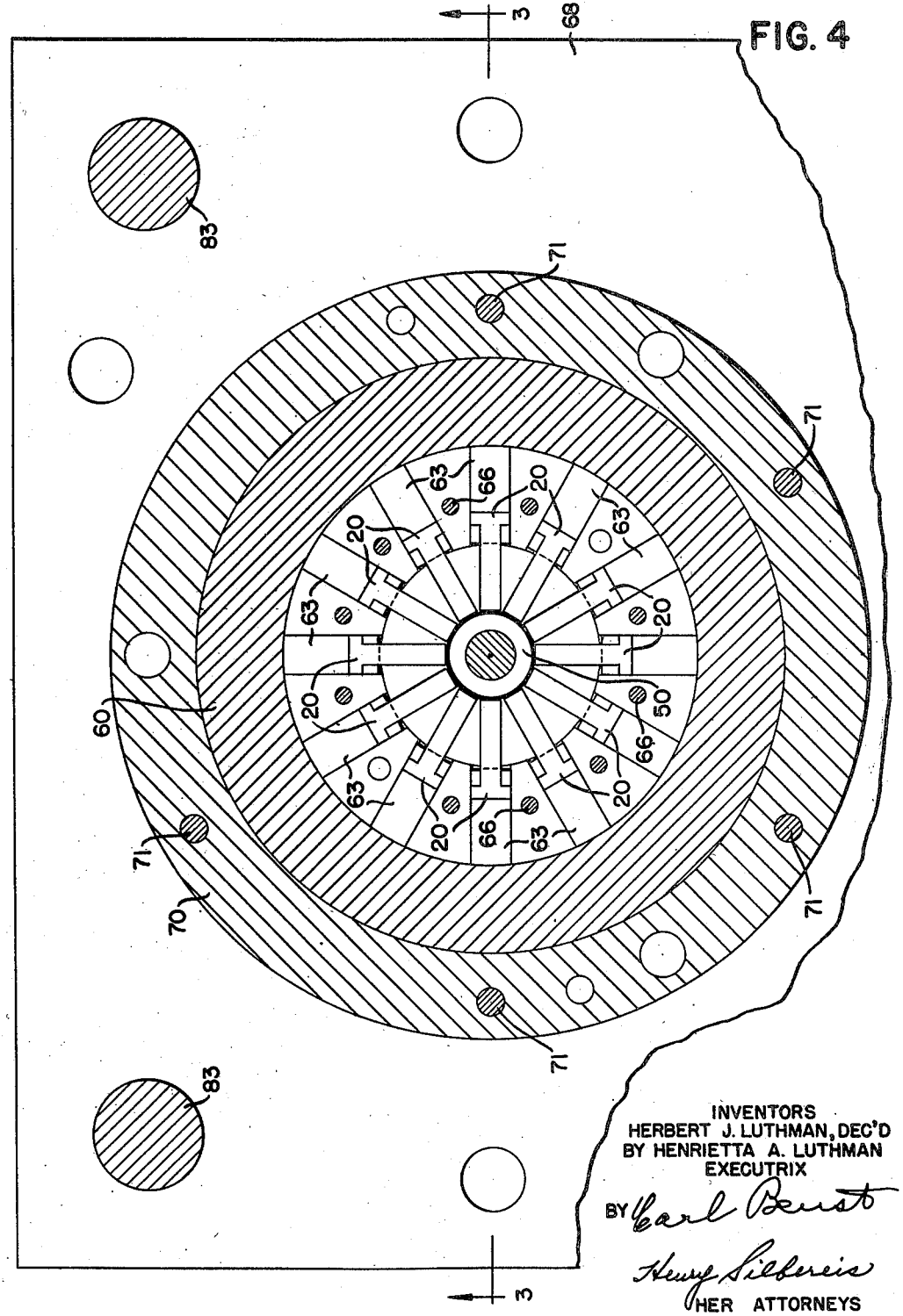

United States Patent Office 2,800,684
Patented July 30, 1957

2,800,684

APPARATUS FOR FORMING POWDERED METAL PARTS

Herbert J. Luthman, deceased, late of Dayton, Ohio, by Henrietta A. Luthman, executrix, Dayton, Ohio, assignor to The National Cash Register Company, Dayton, Ohio, a corporation of Maryland Application July 28, 1953, Serial No. 370,838

2 Claims. (Cl. 18—16.5)

This invention relates to a method and apparatus for making parts from powdered metal.

One of the objects of the invention is to provide a novel method and apparatus for making parts having formations on their perimeters, such as, for example, type wheels.

An object of the invention is to provide an apparatus for making parts from powdered metal which is capable of applying molding pressure in a plurality of directions.

A specific object of the invention is to provide a molding die for molding powdered metal parts, which die is provided with a plurality of matrixes for forming characters on the periphery of a powdered metal part simultaneously with the molding of the part.

Another specific object of the invention is to provide a powdered metal molding die with a means for molding a part together with a plurality of slidable matrixes which are slidable into contact with the part as the part is molded, to form characters on the periphery of the part.

Another object of the invention is the method of forming parts from powdered metal by molding a part in a die having a plurality of matrixes to form characters on the periphery thereof, sintering the molded part until it is in a ductile state, placing the sintered part in a sizing die to form the part to a finish size, and thereafter again sintering the part to a hardened state.

Another specific object of the invention is to provide a molding die and a sizing die to produce powdered metal parts molded in a plurality of directions.

With these and incidental objects in view, the invention includes certain novel features of construction and combinations of parts, a preferred form or embodiment of which will be hereinafter described with reference to the drawings which accompany and form a part of this specification.

Of said drawings:

Fig. 1 is a top plan view of the molding die for pressing parts from powdered metal.

Fig. 2 is a cross-sectional view of the die shown in Fig. 1, taken on line 2—2 of Fig. 1 and looking in the direction of the arrows, and shows the die in its open position.

Fig. 3 is a cross-sectional view of a finishing die for compressing powdered metal parts into accurate size, taken on line 3—3 of Fig. 4, looking in the direction of the arrows, and illustrates the die in its closed position.

Fig. 4 is a cross-sectional view of the finishing die taken on line 4—4 of Fig. 3, looking in the direction of the arrows.

GENERAL DESCRIPTION

In the prior art of making parts of powdered metal, dies have been provided for molding parts in which the die is loaded with powdered metal and pressure is applied in one direction. The flow characteristic of powdered metal is such that the powdered metal does not readily flow in a direction opposite to the direction of the applied pressure. For this reason, the type of parts produced from powdered metal has been limited to the class which has no special formations on their perimeter, such as type characters, which required molding pressure in more than one direction to accurately mold the parts.

In the present invention, which is illustrated for producing type wheels commonly used in accounting machines, cash registers, and the like, two dies are provided. One die is used for moulding the part from powdered metal, and the other die is used to remold the part to accurate size after the part has been sintered to a ductile state. The first die is referred to herein as the "molding" die, and the second die is referred to as the "sizing" die.

The molding die is provided with a cavity which is loaded with powdered metal by any convenient means. As illustrated herein, the device for loading the cavity comprises a movable hopper which is slid across the cavity to deposit the powder therein. The cavity of the die is of sufficient depth to receive a volume of powdered metal which, when compressed, will form a part of the desired thickness. In the herein-illustrated molding die, there are provided a plurality of slidable matrixes having type-character-forming dies on the ends thereof which extend to the wall of the cavity. Means is provided to shift the matrixes into the cavity region at the time the part has been formed to its approximate thickness by molding plungers, and the timing of the movement of the matrixes is such that the molding plungers and the matrixes are moved into their final molding positions at the same time. Thereafter, the matrixes and the plungers are withdrawn, and the molded part is ejected from the cavity.

The molded part is thereafter sintered until the powdered particles are reduced to a unitary ductile state. In the sintering operation, the parts cannot be held to the extreme accuracy required in certain finished parts. To properly size the parts to the fine dimensions required, the sintered parts are placed in the sizing die, which is similar to the molding die. The principal difference in the construction of the sizing die is in the cavity for receiving the sintered part, which cavity is not as deep as the cavity of the molding die, being only of sufficient depth to receive the sintered part. In addition, the sizing die is provided with a locating member, so that the part can be positioned in proper relationship with the character-forming matrixes, which are like the matrixes of the molding die. Plungers are then operated to compress the ductile part to proper thickness, and simultaneously therewith the matrixes are moved into contact with the characters on the ductile part to compress the part along its perimeter.

DETAILED DESCRIPTION

Molding die

The molding die is illustrated in its open position and illustrates a conventional method of filling the die cavity with powdered metal. Any well-known method can be use to fill the cavity, such as sliding a hopper 10 over the cavity 11, to permit the powdered metal 12 to drop into the cavity. The walls of the hopper 10, when slid out from between the die members, levels the powdered metal in the cavity. A supply of powdered metal is funneled into the hopper through a tube 13 of the hopper.

The cavity 11 is formed in a lower die, which comprises a bolster 14 mounted on the frame of a press in the usual manner. Secured in the bolster 14 is a cavity-forming hardened steel collar 15, and a disk 16 is secured to the bolster 14 by a plurality of screws 17. Pins 18 secure the collar 15 to the bolster 14 to prevent shifting of the collar.

The collar 15 is provided with a plurality of slots radially formed around the collar to provide slide-ways for a plurality of matrixes 19, only one of which is shown, similar to the matrixes 20 for the finishing die, illustrated in Fig. 4. The disk 16 maintains the matrixes in the slide-ways. As illustrated herein, the inner ends of the matrixes are provided with character-forming dies which are pressed into the compressed powdered metal to form type characters on the compressed part.

The outer ends of the matrixes are T-shaped to connect with cam slides 21, one being provided for each matrix, radially locked in slide-ways of the bolster 14. The bolster 14 is provided with a circular groove 22 to receive a ring cam 23 having cam edges 24 and 25 engaging similar cam edges in the slides 21, which, when the ring cam 23 is lowered in the groove 22, press the matrixes into the cavity to form characters on the pressed part. The circular groove 22 is of sufficient depth to permit lowering the ring cam 23 therein.

The ring cam 23 is illustrated as being supported on four springs 26, suitably mounted in openings 27 in the bolster 14, in which the ring cam is free to move relatively to the bolster. Four openings 28 are formed in the bolster 14 to receive posts 29 (Figs. 1 and 2) secured to a plate 30 of the upper die. The lower ends of the posts 29 are provided with hardened steel tips 31, which engage the ring cam 23 when the die is operated, to actuate the ring cam 23 and the matrixes 19. A guard 9 is located around each opening 28 to prevent powdered metal from falling therein. The plate 30 is secured to the upper head of a press by which the plate 30 is lowered at the proper time.

An upper punch 32, having a suitable forming surface on its lower end, is slidably mounted in a cylinder 33 secured to the under side of the plate 30 by a plurality of screws 34. A spring 35 normally holds the punch 32 in the lower end of the cylinder 33. A resilient seal 36 is mounted on the outer wall of the punch 32 and engages the plate 16, when the upper die is lowered, to seal off any powdered metal that may tend to be forced out of the cavity during the pressing operation.

A lower punch 37, having its upper end formed to press the desired configuration on the powdered metal part, is mounted to slide in the collar 15. The lower punch 37 is supported on a spring 38, carried by a disk 39, the latter being secured to a base plate 40, carried by a lower movable head of the press. Clearance is provided between the disk 39 and the punch 37 to permit limited relative movement therebetween. When the lower head is raised by the press, the punch 37 is raised in the collar 15 and cooperates with the punch 32 to compress the powdered metal in the cavity 11 into the desired thickness, the latter being governed by the throw of the two punches 32 and 37.

To provide an opening in the center of the pressed part, an arbor 41 is mounted on a stationary part of the framework of the press. The arbor passes through central clearance openings in the plate 39 and the punch 37. The upper end of the arbor has secured thereto a finish collar 42 extending into the cavity 11 to form an opening in the pressed part.

*Operation—Molding die*

After the cavity 11 has been filled with the desired powdered metal and the hopper 10 has been removed from the path of movement of the punch 32, the press, upon which the upper and lower dies are mounted, is released for operation. Operation of the press lowers the plate 30 and the punch 32 and raises the plate 40 and the punch 37. During these movements, the posts 29 enter openings 28, the punch 32 enters the cavity 11, and the rubber seal 36 engages the plate 16, where it is compressed to seal the powdered metal in the cavity. At the same time, the punch 37 is raised to cooperate with the punch 32 to press the powdered metal into the shape determined by the ends of the punches and the size of the cavity. As the posts approach the limit of their travel, which is when the punch 32 reaches its limit of travel, the ends 31 of the posts 29 engage and lower the ring cam 21 to force the matrixes inwardly, thus pressing the characters thereon into the periphery of the molded part. When the punch 32 becomes firmly located in the cavity, it will be arrested, and further movement of the plate 30 compresses the spring 35 to maintain the punch in position under action of the compressed spring. Likewise, when the lower punch 37 reaches its upper position, where it is arrested by the fully-compressed powdered metal, the plate 40 continues to move a short distance to compress spring 38. Thus, at the end of their movements, the punches are held by the tension of springs 35 and 38. An opening 43 below each matrix 19, together with a corresponding opening 44 in the bolster 14, provides means for discharging any powdered metal which may seep past the matrixes during the molding operations, such openings communicating with an undercut section 45 in the bolster 14. After the molding operation has been completed, the punch 32 is raised, and the spring 38 raises the punch 37 relatively to the plate 40 to eject the molded part from the cavity, whereupon the plate 40 is lowered to the original position, illustrated in Fig. 2.

After the part has been removed from the cavity, it is sintered until it is in a ductile state, whereupon it is inserted into a sizing die, where it is compressed to the desired dimensional size and finish.

*Sizing die*

The die for finishing, or sizing, the sintered powdered metal parts is shown in Figs. 3 and 4. Fig. 3 illustrates the die in closed position, wherein the part 50 is shown between an upper forming punch 51, a lower forming punch 52, and a plurality of matrixes 20, the latter being arranged radially around the part, as illustrated in Fig. 4. The punch 51 is movably mounted in a cylinder 53, the latter being secured to a plate 54 by a plurality of screws 55. The mounting between the punch 51 and the cylinder 53 is such that, when the punch 51 is in operating position, it is pressed against the part by a spring 56, and, when the plate 54 and the cylinder 53 are raised, the spring 56 moves the punch relatively to the cylinder a short distance as controlled by the spacing of a shoulder 57 on the punch and a shoulder 58 on the cylinder 53. The plate 54 is secured to a movable head on a press by means of which the plate 54 is raised and lowered.

Also secured to the plate 54 is a ring cam 60, which is held thereon by a plurality of screws 61. The ring cam has a cam edge 62 extending around the complete inner wall of the ring cam. The cam edge 62 engages a plurality of slides 63, one for connection with each matrix 20. The outer end of each matrix is T-shaped to engage a correspondingly-shaped notch in each slide 63. Thus, when the ring cam 60 is lowered into the illustrated positions, the matrixes 20 are all forced into pressing engagement with the sintered part 50, which, being ductile, can be formed into the desired shape or size.

A locating block 64 is secured to a plate 65 to enable the operator to properly position the sintered part in the die. The plate 65 is located above the matrixes 20 to maintain them in their slots in the punch 52, and the plate 65 is held in position by a plurality of screws 66.

The punch 52 has a matrix 67 mounted thereon, which is moved into engagement with the under side of the sintered part to give it the proper shape and size.

The punch 52 is secured to a bolster 68, mounted on a movable bed of a press, and the punch 52 is secured to the bolster 68 by a plurality of screws 69. Also mounted on the bolster 68 is a ring 70 for guiding the ring cam in its up-and-down movements. The ring 70 is held in position by screws 71. An arbor 72 on the punch 52 provides a means for holding the center hole of the sintered part 50 to size during the pressing operation.

Before the sized part can be removed from the die cavity, the matrixes 20 must be moved out of contact with said sized part. To this end, the slides 63 are notched on their under sides for engagement by releasing slides 75, the latter being provided with toes 76 for such engagement. The slides are supported on the bolster 68 and are guided in their movements by two slotted rings; i. e., an outer ring 77 and an inner ring 78, both of which are supported on the bolster 68. The inner ends of the releasing slides 75 have, formed on their lower corners, cam edges which are in engagement with the cam edges on the upper end of rods 79, when the die is in the closed position, shown in Fig. 3. It is to be understood that one rod 79 is provided for each slide 75. The rods 79 are supported on a plate 80 carried by the framework of the press. A guide post 81 on the plate 80 guides the bolster 68 in its up-and-down movements, the bolster 68 being provided with an opening passing over said guide post.

When the bolster 68 is lowered to open the die, the cam edges on the rods 79, coacting with the cam edges on the slides 75, cause the slides 75 to move outwardly, which, through the toes 76, moves the slides 63 outwardly to withdraw the matrixes 20 from engaging the sized part. It is understood that, before the rods 79 become effective to withdraw the matrixes, the ring cam 60 will have been raised sufficiently to permit such withdrawing movement of the matrixes.

A knock-out rod 82 is provided to push the sized part out of the die cavity, by engagement with the top of the guide post 81 when the bolster is lowered. The rod 82 engages the under side of the matrix 67 to raised it and the sized part upwardly, where the operator can remove the part from the dies.

Guide posts 83 on the plate 54 engage holes in the bolster 68 to properly aline the two parts of the die in the operating movements. Only two posts are shown, but any required number of guide posts may be provided.

*Operation—Sizing die*

After the molded part has been sintered, it is desirable to press the part to accurate dimensions in those cases where extreme accuracy is essential. At the end of a molding operation, the upper and lower dies are spaced apart, so that the part 50 can be positioned in the cavity of the die, the locating block 64 being used to accurately position the part 50 in relation to the matrixes 20, which matrixes have formed thereon the characters pressed therein by the matrixes of the molding die.

When the press is released for operation, the plate 54 lowers the punch 51, and the bolster 68 raises the matrix 67 to engage the top and bottom sides of the part 50. After the punch 51 engages the top of the part 50, the plate 54 continues to move to compress the spring 56 to apply its force on the part 50. At the same time, the ring cam 60 cams the slides 63 and the matrixes 20 into engagement with the periphery of the part 50, the pressure applied thus forming the part 50 to accurate dimensions, after which the plate 54 is returned upwardly, and the bolster 68 is moved downwardly, to open the die. As the bolster 68 is lowered, the cam edges on the slides 75, engaging the cam edges on the posts 79, cause the slides 68 and 63, together with the matrixes, to move outwardly to disengage the latter from the finished part 50 to free it for removal from the die cavity. As the bolster reaches the terminus of its downward movement and after the part 50 has been freed from the matrixes 20, the knock-out rod 82 strikes the guide post 81, and continued movement of the bolster 68 actuates the knock-out rod 82 to raise the matrix 67, thus removing the finished part 50 from the die cavity.

After the finished part 50 has been removed from the cavity, it is again sintered to give it its desired density.

While the form of the invention shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. In a die for forming parts from powdered metal, the combination of a bolster having a cavity for receiving the powdered metal elements, an upper punch having a forming configuration on the lower end thereof, a spring effective after the upper punch has been lowered to maintain the upper punch resiliently in lowered position, a lower punch having forming configurations on the upper end thereof, a spring effective after the lower punch has been raised to maintain the lower punch resiliently in raised position, a plurality of matrixes arranged radially around the perimeter of the cavity, each matrix having forming configurations on the inner end thereof, a ring cam movable into engagement with the ends of all the matrixes to move the matrixes toward the cavity, and means to operate said matrixes and punches simultaneously to press the powdered elements into a predetermined shape.

2. In a die for forming parts from powdered metal, the combination of a bolster having a cavity for receiving the powdered metal elements, an upper punch having a forming configuration on the lower end thereof, a spring effective after the upper punch has been lowered to maintain the upper punch resiliently in lowered position, a lower punch having forming configurations on the upper end thereof, a spring effective after the lower punch has been raised to maintain the lower punch resiliently in raised position, a plurality of matrixes arranged radially around the perimeter of the cavity, each matrix having forming configurations on the inner end thereof, a ring cam movable into engagement with the ends of all the matrixes to move the matrixes toward the cavity, means to operate said matrixes and punches simultaneously to press the powdered elements into a predetermined shape, and means to remove the formed part from the cavity after the punches are separated.

References Cited in the file of this patent

UNITED STATES PATENTS

| | | |
|---|---|---|
| 1,609,460 | Buttles | Dec. 7, 1926 |
| 2,287,952 | Tormyn | June 30, 1942 |
| 2,319,373 | Tormyn | May 18, 1943 |
| 2,342,799 | Goetzel | Feb. 29, 1944 |
| 2,350,971 | Pecker | June 6, 1944 |
| 2,360,528 | Talmadge | Oct. 17, 1944 |
| 2,411,073 | Whitney | Nov. 12, 1946 |
| 2,633,603 | Huse | Apr. 7, 1953 |

FOREIGN PATENTS

| | | |
|---|---|---|
| 535,906 | Germany | Oct. 16, 1931 |